United States Patent

Libby

[15] 3,694,070

[45] Sept. 26, 1972

[54] COPYING SYSTEM FEATURING SCANNING ILLUMINATION ELEMENTS

[72] Inventor: Edwin L. Libby, Lexington, Ky.

[73] Assignee: International Business Machines Corporation, Armonk, N.Y.

[22] Filed: Aug. 24, 1970

[21] Appl. No.: 66,326

[52] U.S. Cl. ..................... 355/8, 95/12.5, 355/49, 355/66
[51] Int. Cl. .................................. G03g 15/04
[58] Field of Search ........ 95/12.5, 15, 4.5; 355/8, 66, 355/49

[56] References Cited

UNITED STATES PATENTS

| 2,600,168 | 6/1952 | Klyce | 95/4.5 |
| 3,523,725 | 8/1970 | Schaeffer | 355/8 |
| 3,019,292 | 1/1962 | John | 95/12.5 |

FOREIGN PATENTS OR APPLICATIONS

| 455,489 | 1968 | Switzerland | 355/66 |

Primary Examiner—Samuel S. Matthews
Assistant Examiner—E. M. Bero
Attorney—Hanifin and Jancin and D. Kendall Cooper

[57] ABSTRACT

A copying system includes scanning illumination elements that focus the light only on the area of the original document that is actually being optically scanned by the system. A first embodiment has rotating reflectors cooperating with stationary lamp elements to project a line of light onto an original document and a rotating mirror receiving image information from the original document and transmitting the same through a lens element to an image plane. A second embodiment has a rotating mirror that receives light from stationary lamp elements in a first portion of the mirror, reflects a line of light to the original document and receives image information from the original document in a second portion of the mirror for transmission through a lens element to an image plane.

2 Claims, 3 Drawing Figures

PATENTED SEP 26 1972 3,694,070

INVENTOR
EDWIN L. LIBBY

BY D. Kendall Cooper
ATTORNEY 3,694,070

COPYING SYSTEM FEATURING SCANNING ILLUMINATION ELEMENTS

BACKGROUND OF INVENTION AND PRIOR ART

The following U.S. Pat. Nos. are representative of the prior art:

2,508,650

3,072,798

3,184,847

3,205,367

3,360,659

The patents noted disclose various schemes for scanning, none of which appear to contemplate the rotating lamp reflector or rotating mirror with stationary lamp reflector arrangements taught herein. Prior systems usually teach the illumination of the entire document plane which results in an inefficient use of light energy and limits the light level since the available energy must be spread over the entire document.

SUMMARY OF THE INVENTION

In a first version, an original document is positioned on a curved document plane. Lamp elements are positioned in a predetermined relationship with respect to the original document plane, each lamp element having a rotating reflector. A rotating scanning mirror is positioned to convey reflected light energy from the original document through a lens element. Scanning is accomplished by rotating the lamp reflectors and the scanning reflector mirror in timed synchronism to convey the information from the original document to an imaging station in the apparatus.

In a second version of the invention, the original document is placed on a curved plane as in the first version. The second version also makes use of a rotating scanning mirror of relatively large size that receives light energy from a pair of lamps, the lamps remaining in a relatively stationary location. The illumination from the lamps is reflected from one portion of the rotating scanning mirror during scanning to the original document plane, back to another portion of the rotating scanning mirror, and then through a lens element to the imaging station.

OBJECTS

A primary object of the present invention is to provide an optical system that is appreciably more efficient than prior systems.

Another object of the invention is to provide copying apparatus having facilities for establishing high intensity illumination of an original document for imaging purposes.

Still another object of the present invention is to provide scanning facilities in a copying apparatus that insure the most efficient use of the source of illumination of the original document, thereby enhancing the imaging operation in the system.

The foregoing and other objects, features, and advantages of the invention will be apparent from the following more particular description of the preferred embodiments of the invention as illustrated in the accompanying drawings.

DRAWINGS

DETAILED DESCRIPTION

High Speed Copier System

Figure 1:
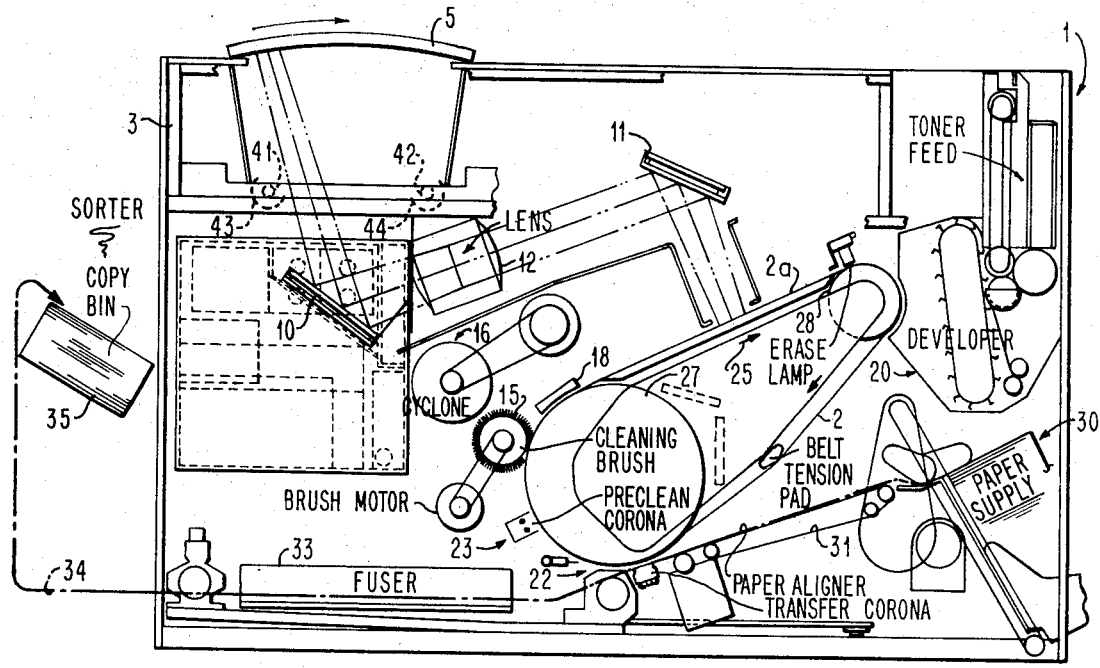
FIG. 1 is a schematic diagram of a high speed copier system utilizing a photoconductive belt for the conveyance of images projected thereon from an original document.

FIG. 1 illustrates a high speed copier unit 1 incorporating the present invention. The unit includes a photoconductor belt 2 and has a main frame 3 supporting various elements for producing a multitude of copies at high speeds from original documents. An original is positioned on the original curved document surface 5 and is illuminated by lamps 41 and 42 in timed relation with movement of belt 2. An optical system including mirrors 10 and 11 and lens element 12 project the image of the original toward an image plane 2a on belt 2.

The unit in FIG. 1 includes the customary electrophotographic facilities for producing copies. These include a cleaning brush 15 with associated cyclone cleaning system 16, a charge corona station 18, the image plane 2a, previously mentioned, a developer station 20, a transfer station 22, and a preclean corona station 23. Belt 2 is mounted for movement as indicated by arrow 25 on drum driving elements 27 and 28. A paper supply 30 accommodates a large quantity of individual sheets of paper that are fed by various devices including a belt 31 to the transfer station 22 for transfer of images in timed relation with movement of belt 2. Following such transfer, the image is fused by fuser 33, passes by transportation means 34, not shown, to a completion station, such as a sorter copy bin 35.

Figure 2:
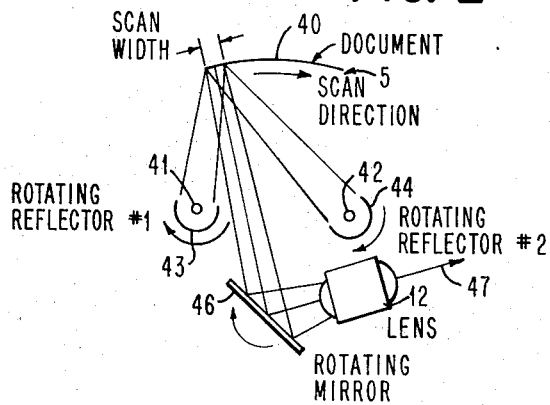
FIG. 2 illustrates a first version of the invention particularly utilizing lamp elements as the source of light, each lamp element having a rotating reflector moved in timed relation with a rotating mirror.

Embodiment of FIG. 2

FIG. 2 shows a first embodiment of the invention having provision for supporting an original document 40 on the curved surface 5. Other elements in the embodiment of FIG. 2 are lamps 41 and 42, each having an associated reflector 43 and 44, respectively. A lens element 12 corresponding to that shown in FIG. 1 cooperates with a rotating mirror 46 to convey an image as indicated by arrow 47 to mirror 11 for ultimate projection on belt 2 at the image station 2a. In operation, reflectors 43 and 44 are rotated in timed synchronism with mirror 46 to scan original document 40. The arrangement is such that the light output of lamps 41 and 42 is efficiently directed to the surface of document 40 with high intensity for reflection back to scanning mirror 46 through lens 12 to the image plane. As is evident, the arrangement insures a highly efficient use of the light from lamps 41 and 42. That is, as mirror 46 scans each portion of document 40, that portion is illuminated with high intensity and the information conveyed to the image plane results in a copy with greater accuracy of image, better gradation of tones, and greater intensity.

Figure 3:
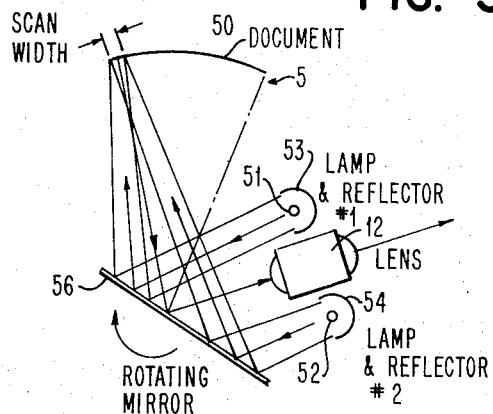
FIG. 3 illustrates another version of the invention in which the lamp elements and associated reflectors are maintained in a predetermined relatively fixed location but reflected to the original document surface during scanning by means of a relatively large rotating mirror.

Embodiment of FIG. 3

FIG. 3 illustrates an alternative arrangement for achieving high intensity illumination of the original document during scanning. This embodiment includes an original document 50 positioned on the curved surface 5. Other elements involved in the scanning are lamps 51 and 52 with respectively associated reflector elements 53 and 54. A rotating scanning mirror 56 moves in timed synchronism with the movement of photoconductor belt 2 to first reflect light energy from lamps 51 and 52 toward original document 50 and thereafter receive reflections from document 50 for conveyance through lens 12 to image plane 2a as with the embodiment of FIG. 2. In this case, lamps 51 and 52 and reflector elements 53 and 54 remain in a relatively stationary condition at all times, and the intensification of the light energy on the surface of document 50 together with a scanning action is achieved through the timed rotation of mirror 56. While somewhat less efficient than the version of FIG. 2, the embodiment of FIG. 3 provides a much higher intensification of the light energy than with prior systems.

While the invention has been particularly shown and described with reference to several embodiments, it will be understood by those skilled in the art that various changes in form and detail may be made without departing from the spirit and scope of the invention.

What is claimed is:

1. A system for copying apparatus operable during a scan operation to scan and transmit image information from an original document comprising:

means for supporting said original document for scanning;

at least one energizable lamp element arranged for illumination of said document;

means fixedly mounting said lamp element so that it remains stationary during operation of said system;

a projection system including at least a lens element for conveying information from said original document to an imaging area during a scanning operation;

a scanning reflector means positioned in the path of travel of image information reflected from said document for receiving said image information and transmitting said image information to said lens element for conveyance to a said imaging area during a scan operation;

means for continually rotating said scanning reflector means during a scan operation to effect scanning of successive areas of said original document and conveyance of an image thereon to said imaging area;

means for continually energizing said lamp element during a said scan operation;

movable lamp reflector means positioned behind said lamp element for projecting concentrated light energy toward said original document during a said scan operation;

and means for continually moving said lamp reflector means to convey said concentrated light energy toward said successive areas of said original document in synchronism with rotation of said scanning reflector means to discriminately illuminate each area during scanning thereof.

2. The system of claim 1, further comprising:

a second lamp element;

means for continually energizing both said lamp elements during a said scan operation;

a second movable lamp reflector means positioned behind said second lamp element for projecting concentrated light energy toward said original document during a said scan operation;

and means for continually moving both said lamp reflector means to convey concentrated light energy from both lamp elements toward successive areas of said original document in synchronism with rotation of said scanning reflector means during a said scan operation.

* * * * *